R. W. HOEY.
RUNNING GEAR FOR CHILDREN'S CARRIAGES.
APPLICATION FILED OCT. 18, 1910.
993,066.
Patented May 23, 1911.
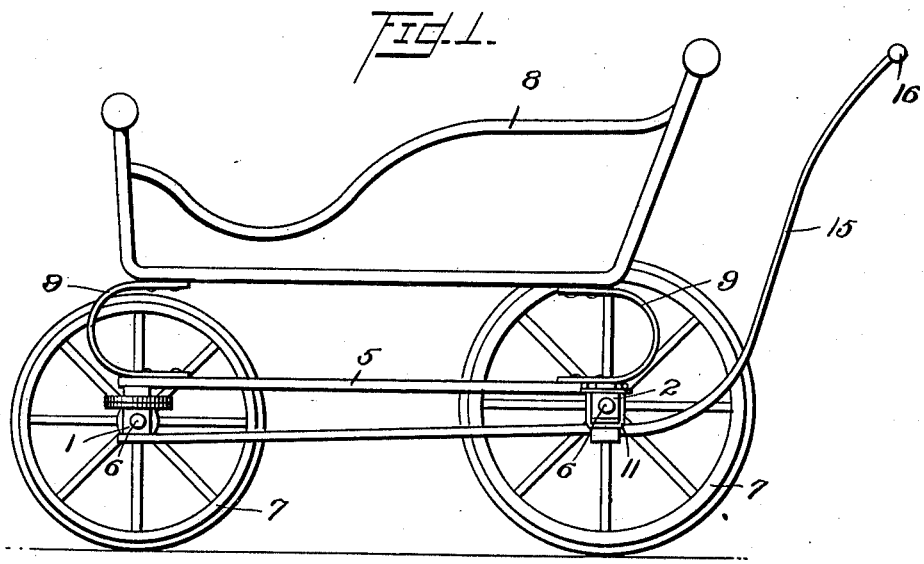
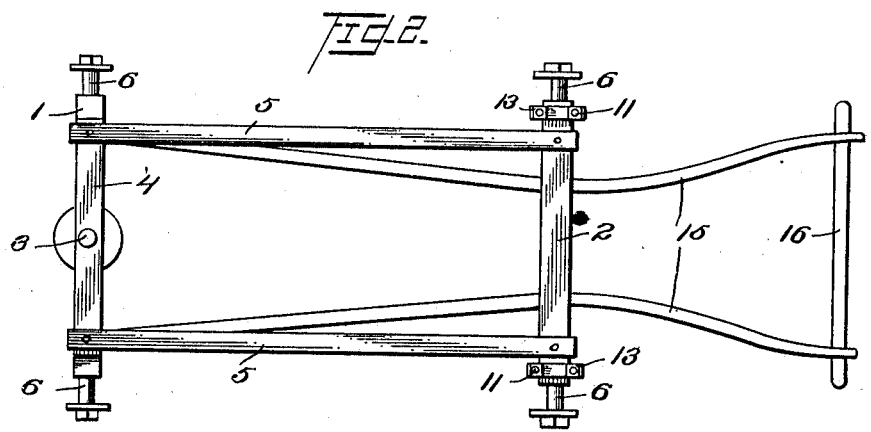
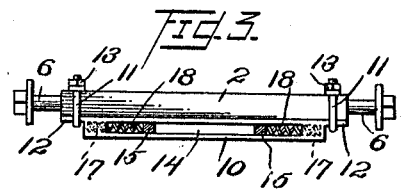
Witnesses
H. Strauss
R. H. Krenkel
Inventor
Robert W. Hoey,
By Joshua R. H. Potts.
Attorney

UNITED STATES PATENT OFFICE.

ROBERT W. HOEY, OF PHILADELPHIA, PENNSYLVANIA.

RUNNING-GEAR FOR CHILDREN'S CARRIAGES.

993,066.  Specification of Letters Patent.  Patented May 23, 1911.

Application filed October 18, 1910. Serial No. 587,732.

*To all whom it may concern:*

Be it known that I, ROBERT W. HOEY, a citizen of the United States, residing at Philadelphia, in the county of Philadelphia and State of Pennsylvania, have invented certain new and useful Improvements in Running-Gear for Children's Carriages, of which the following is a specification.

My invention relates to improvements in running gear for children's carriages, the object of the invention being to provide an improved construction whereby the movement of the handles serves to pivot the front axle rendering it easy to guide the carriage along the pavement.

A further object is to provide improved centering means which normally hold the front axle in position to maintain the front wheels in a straight line, so that if pressure is released from the handle, the front axle will center itself.

With these and other objects in view, the invention consists in certain novel features of construction and combinations and arrangements of parts, as will be more fully hereinafter described and pointed out in the claim.

In the accompanying drawings: Figure 1, is a view in side elevation with two of the wheels left off to better illustrate my improvements. Fig. 2, is a plan view of the running gear, and Fig. 3, is a view in rear elevation of the rear axle showing the handle bars in section.

1, and 2, represent the front and rear axles respectively, the former connected by a king bolt 3 with a transverse bar 4, said transverse bar connected with the rear axle by longitudinal bars 5 as clearly shown in Fig. 2.

The axles 1 and 2 are provided with journals 6 to receive the ordinary wheels 7, and the body 8 of the carriage is supported on bars 5 by means of springs 9. The particular construction of the carriage and its mounting forms no part of the present invention, and the one shown is merely for purposes of illustration.

To the under face of the rear axle 2, a longitudinally extending guide bracket 10 is secured by means of U-bolts 11, which straddle the axle and engage over lugs 12 at the ends of the guide bracket, and are secured by nuts 13 as shown. This guide bracket is made with a longitudinal slot 14 through which the handle bars 15 project, said handle bars secured at their forward ends to the front axle 1, and at their rear ends projecting upwardly and rearwardly and connected by a bar or handle 16.

In the ends of the bracket 10, pockets 17 are provided for the reception of coiled springs 18, said coiled springs bearing at one end against the inner ends of the pockets, and at their outer ends against the handle bars 15 tending always to hold the handle bars in an intermediate position with the front axle in normal position, and the front wheels straight.

In operation, it is simply necessary to move the handles slightly to the right or left to swing the front axle and steer the carriage, and when pressure in either direction is released, the springs 18 will return the bars to their normal position. This is an extremely important feature, for if the carriage should be unattended and start to move, the front axle might turn so as to veer the carriage into the gutter, but the springs will compel the front wheels to run straight, and as they balance each other, they will add little if any resistance to the free movement of the handle bars.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

In a vehicle of the character described, the combination with a pivoted front axle, and a fixed rear axle, two handle bars secured to the front axle and spaced apart, a bracket secured to the rear axle and having a longitudinal slot therein through which both of said handle bars project, and springs supported in said bracket at the outside of said bars, and bearing against said bars, said bracket having pockets in its ends for the reception of said springs, outwardly projecting lugs on said bracket, and U-bolts engaging the rear axle and said lugs securing said bracket to the under face of said axle, substantially as described.

In testimony whereof I have signed my name to this specification in the presence of two subscribing witnesses.

ROBERT W. HOEY.

Witnesses:
J. J. HOEY,
R. H. KRENKEL.

Copies of this patent may be obtained for five cents each, by addressing the "Commissioner of Patents, Washington, D. C."